Z. STREET.
Stock Car.
No. 106,887.
Patented Aug. 30, 1870.
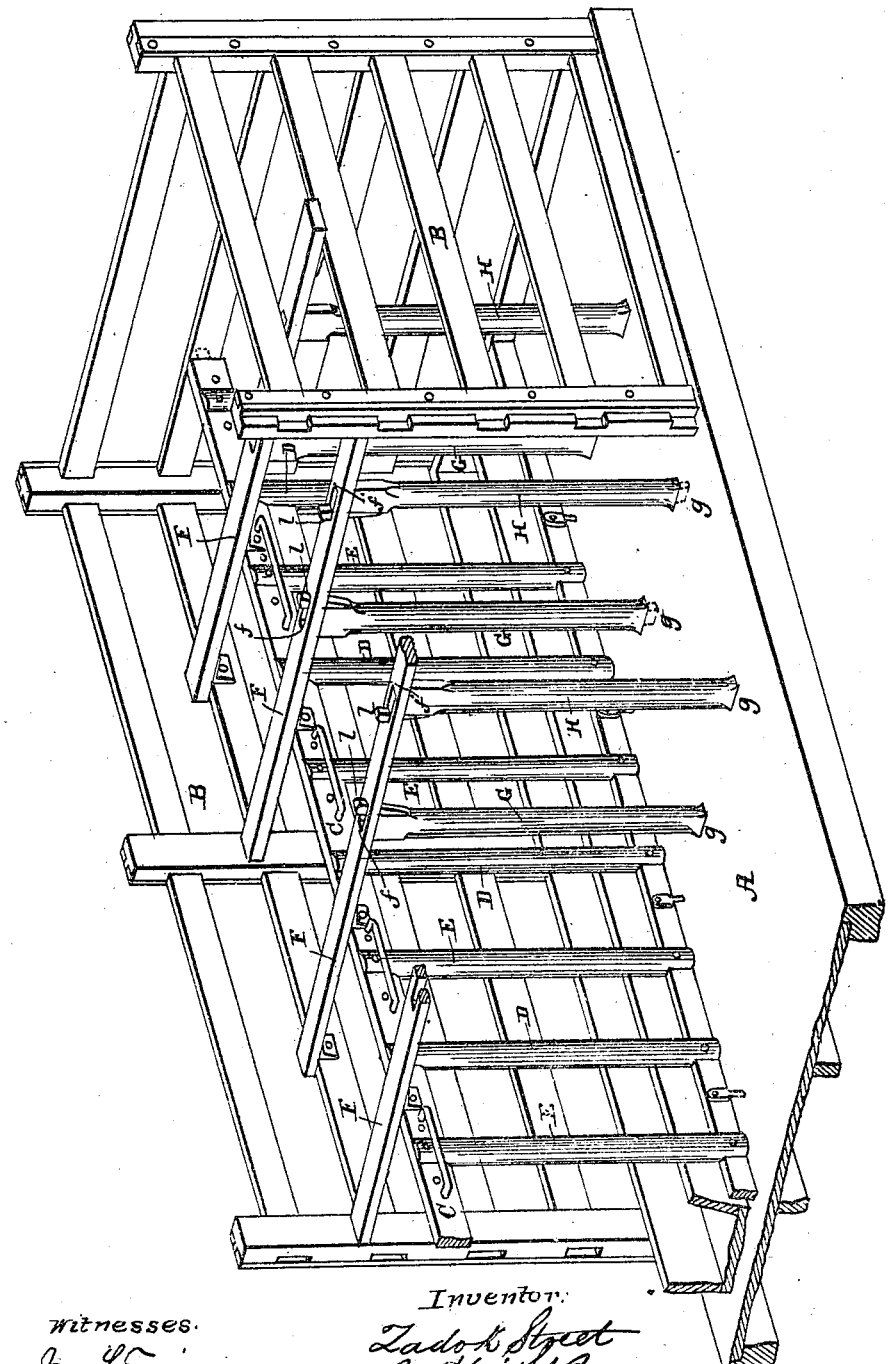
witnesses·
Inventor·

United States Patent Office.

ZADOK STREET, OF SALEM, OHIO.

Letters Patent No. 106,887, dated August 30, 1870.

IMPROVEMENT IN STOCK-CARS.

The Schedule referred to in these Letters Patent and making part of the same

I, ZADOK STREET, of Salem, in the county of Columbiana and State of Ohio, have invented an Improved Cattle or other Stock-Car, of which the following is a specification.

Nature and Objects of the Invention.

My improvements refer to means for fastening and separating cattle in railroad-cars.

The animals are held by stanchions on each side of the neck, one of each pair being movable, and the pairs adjustable as to distance for different sized cattle.

The animals are separated by vertical bars just behind the shoulder and by the hips, so that their abdomens, being the parts which occupy the most lateral space, may come in close contact from one end to the other of the car. The cattle are thus caused to brace and support each other while the cars are in motion.

The posts or vertical bars are thus relieved of much strain, while they effectually prevent the strong from overpowering or crowding upon the weak, and they occupy no valuable space in the car because they permit as many animals to be stowed in a given space as could be without them.

All the bars are removable for stowage of dead freight, and may be readily replaced for loading cattle.

Description of the Accompanying Drawing.

The invention is shown by a perspective view.

General Description.

A is the floor of the car, and
B B the sides.

C is a longitudinal sectional frame about two feet from the side of the car, and secured thereto by framing and bolts in any secure manner.

In the frame C are certain vertical stanchions, D, which are bolted top and bottom.

Other stanchions, E, are bolted at bottom, and at top are secured by bolt, pin, hook, or latch, to secure the heads of the cattle.

The distance apart of the pairs of stanchions is determined by the size of the cattle to be transported.

Across the top of the car, above the stanchions D, are bars or planks, F, with two mortises, $f\ f'$, corresponding to similar mortises, $g\ g'$, in the floor of the car.

G H are vertical posts or bars which are respectively opposite to the shoulders and hips, or thereabout, (as before stated,) of the cattle which are confined by the stanchions. These uprights are planed smooth, so as to avoid abrading the skins of the animals which are separated thereby. The uprights serve to support the animals laterally as well as to confine each to its allotted space. They may be padded or cushioned at the lower portions, if required, in case the cattle have to perform long journeys.

The lower end of each upright fits into a floor-mortise, and the upper end is notched, as shown at $l$, so that, when driven laterally by the wedge $m$, it may be secure against rising by the rubbing against it of the cattle.

The frame and uprights described for yoking and separating the cattle can all be readily unshipped and put on top of the car when the latter is to carry return freight.

Claim.

I claim as my invention—

The arrangement, in a cattle-car, of the frame C and stanchions E D, in combination with the separating posts G H, located so as to be at or near the shoulders and hips of the animals, as and for the purposes set forth.

ZADOK STREET.

Witnesses:
THOMAS BONSALL,
AL. E. BONSALL.